Sept. 22, 1936.  A. B. SCHULTZ  2,055,182
AUTOMATIC SLACK ADJUSTER
Filed June 6, 1932
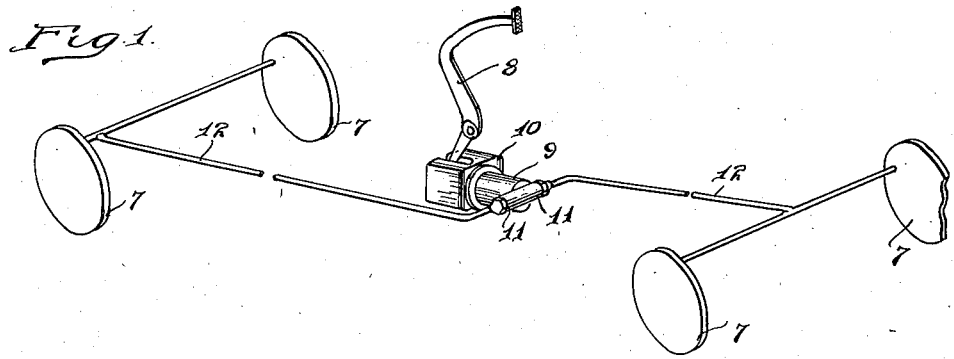
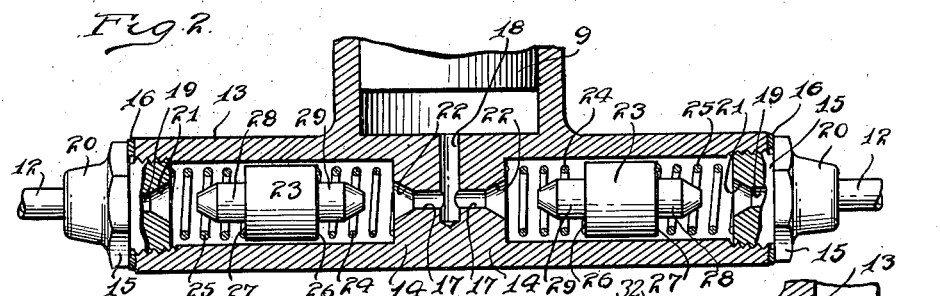
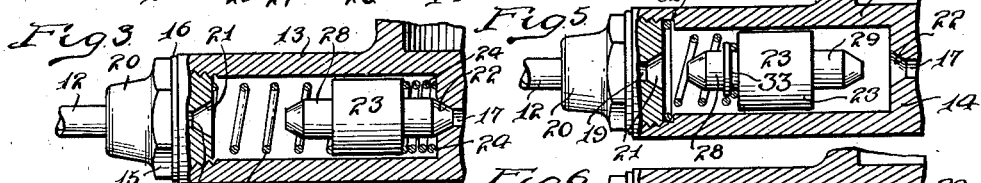
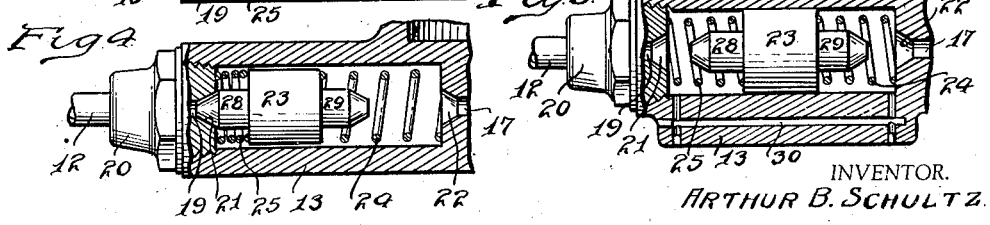
INVENTOR.
ARTHUR B. SCHULTZ.
BY Edward M. Apple
ATTORNEY.

Patented Sept. 22, 1936

2,055,182

UNITED STATES PATENT OFFICE 2,055,182

AUTOMATIC SLACK ADJUSTER

Arthur B. Schultz, Detroit, Mich.

Application June 6, 1932, Serial No. 615,578

5 Claims. (Cl. 188—196)

This invention relates to improvements in liquid pressure mechanisms. In its broader aspects, the invention may be applied to various types of hydraulic devices, in which the actuated member is of a type which acts against a positive stop and is retracted when pressure is released. The embodiment specifically referred to herein discloses its application to a hydraulic braking system for self-propelled vehicles.

The principal object of the invention is to provide a device which will automatically control the distance of retraction of the actuated member when the actuating fluid pressure is released.

Another object of the invention is to provide a device which will automatically adjust the fluid volume in hydraulic brake lines to compensate for the variations caused by the change of temperature, the loss of fluid, and the like.

Another object of the invention is to provide an adjustment for hydraulic brakes which will automatically take up excessive brake shoe clearances caused by worn brake linings.

Another object of the invention is to provide a device which will at all times maintain a positive pressure in the fluid lines and eliminate the possibility of air bubbles entering the fluid lines and causing the objectionable "soft pedal" action familiar to the users of hydraulic brakes.

Another object of the invention is to provide a device which will increase the power and efficiency of the braking system by allowing the full stroke of the actuating member to be used for work instead of allocating a certain portion of said stroke to compensate for brake surface wear.

Another object of the invention is to provide a safety device which will automatically stop the loss of fluid in the event that a break should occur in one of the lines.

The foregoing and such other objects of the invention as will appear hereinafter as the description proceeds, will be more readily understood from an examination of the following specification, reference being had to the accompanying drawing, in which:

Fig. 1 is a plan view in outline of a braking system of an automotive vehicle in which my invention is embodied.

Fig. 2 is an enlarged view, partly in section, showing my invention in parallel as an integral part of the compressor of a hydraulic braking system.

Fig. 3 is an enlarged view, partly in section, illustrating the position assumed by the reciprocating member when the brake pedal and compressor piston are at rest.

Fig. 4 is an enlarged view, partly in section, illustrating the position assumed by the reciprocating member when a fluid line to the wheels is broken.

Fig. 5 is an enlarged view, partly in section, of a modified form of my invention illustrating the use of a double acting spring instead of two separate springs for maintaining the reciprocating member in its neutral position.

Fig. 6 is an enlarged view, partly in section, of a modified form of my invention illustrating the use of a tight fitting reciprocating member with a separate by-pass in the cylinder wall.

Referring now to the drawing, it will be seen that this automatic control device, embodying my invention, is illustrated as being used in connection with a hydraulic braking system for automobiles, but it will be apparent to those skilled in the art that it might readily be used in connection with any fluid system in which it is necessary or desirable to have a uniform reciprocating movement of a fluid actuated member.

In the drawing, 7 represents a set of automotive vehicle brakes operated by pressure exerted upon a foot pedal 8, which in turn actuates a fluid compressor 9, contained in housing 10, which said compressor in turn transmits pressure to the brakes 7 through the automatic control members 11 and the fluid lines 12.

The automatic control member 11, in which resides the embodiment of my invention, comprises a cylinder 13 having a bore of suitable diameter and length, and preferably made with a fixed head 14 and a removable head 15. The latter is provided with an externally threaded shoulder adapted to engage internal threads on the cylinder 13. A gasket 16, of any suitable material, is interposed between the ends of the cylinder walls 13 and the removable head 15.

The fixed head 14 is provided with a longitudinal passageway 17. The removable head 15 is also provided with a longitudinal passageway 19, which communicates directly with the fluid lines 12. The fluid lines 12 are secured to the removable head 15 by any suitable coupling means 20.

The longitudinal passageway 19, in the removable head 15, has an enlarged annular recess 21 disposed near its inner terminus. The longitudinal passageway 17 has a similar annular recess 22 near its inner terminus.

A full floating reciprocating member 23 is carried in the cylinder 13. This reciprocating member 23 is loosely fitted in said cylinder 13 with sufficient clearance to allow fluid to by-pass it. The reciprocating member 23 is maintained in a predetermined intermediate position by means of springs 24 and 25 which are interposed between the faces 26 and 27 of the reciprocating member 23 and the cylinder heads 14 and 15 respectively.

The reciprocating member 23 is provided at its ends with projections 28 and 29 of such peripherial contour as will allow their engagement with the annular recesses 21 and 22.

The operation of the device is as follows:

When the system is filled with fluid and pressure is applied to the fluid in the compressor 9, this pressure is transmitted through the passageway 18 into the cylinder 13, thereby causing the reciprocating member 23 to be displaced in the same direction as the moving fluid. In this operation the reciprocating member will move with the liquid until the fluid pressures in the compressor 9, the passageways 17 and 18, and the fluid lines 12 become the same, at which time fluid flow to the brakes ceases. During this operation flow of fluid past the loosely fitting piston will be negligible, due to the small element of time required for the operation. When that condition is arrived at, the reciprocating member 23 should be in the position, as shown in Fig. 2, at which position springs 24 and 25 are under equal compression. It is obvious that if the reciprocating member 23 be then displaced, either to the right or left from its neutral position, as shown in Fig. 2, it will tend to return immediately to its neutral position under the influence of the difference in spring compressions set up by such displacement. Because of the difference in the spring compressions liquid will then flow around the reciprocating member 23 toward the side of lesser pressure until the spring compressions again become equal, at which stage the reciprocating member 23 will again resume its neutral position.

When the brake pedal 8 is released the fluid pressure in the compressor 9 and the passageway 18 is reduced from approximately two hundred pounds per square inch to practically zero. This causes the fluid in the brakes 7 and the passage-way 12, which is under a pressure of from ten to twenty pounds per square inch caused by the customary brake shoe pulled back springs (not shown), to rush towards the passage-way 17 and back into the compressor 9. As the fluid moves towards the compressor 9 it carries piston 23 along with it for the reason that the fluid is unable to pass around the piston 23 fast enough to permit the piston 23 to remain stationary. This will be more readily comprehended when it is understood that the springs 24 and 25, which are of practically the same strength, have a resistance of only a fraction of an ounce when fully compressed, whereas the fluid trying to get by the piston 23 has a force of from four to five pounds. Thus the piston 23 is rushed towards the seat 22, which it quickly contacts and makes a fluid tight seal, as shown in Fig. 3, in which position it remains until the brakes are again applied.

Although the pressure in all parts of the cylinder 13 tends to become equal because of the loose fit of the piston 23, there is still a hydraulic pressure exerted upon the piston 23 sufficient to hold the piston 23 against the seat 22. That pressure represents the differential in pressures acting upon the piston from each end. In Fig. 3 the pressure acting on the left end of the piston is from ten to twenty pounds per square inch over the entire area, and on the right end of the piston 23 the pressure is the same over the entire area except that portion which is in the recess 22. On the latter area the pressure is practically zero, as it will be remembered the pressure in the passage-way 17 was reduced to almost nothing when the brake pedal 8 was released. It will also be remembered that the springs 24 and 25 are comparatively weak, but of equal strength. It is, therefore, the difference in pressures acting upon an area equal to the area of the passageway 17 that overcomes the resistance of the spring 24 and causes the piston 23 to remain seated.

When the piston 23 seats in recess 22 the flow of fluid from the brakes 7 immediately ceases. As the movement of the piston 23 from the neutral to the seating position, as shown in Fig. 3, is almost instantaneous, very little of the fluid will have time to pass around the piston 23 before the latter is seated, so that the volume swept by the movement of the piston 23 will be equal to the volume drawn from the brake cylinder. As the piston 23 centers itself, as shown in Fig. 2, upon each application of the brake it is apparent that the brake shoes will contract to the same clearance each time the brakes are released. Each time the brakes are subsequently applied, the travel of the brake pedal will be the same, so it is apparent that there will result an automatic adjustment of the brake shoe clearance upon each application and release of the brakes.

In a normal operation, then, it will be seen that the piston 23 will move from its position, as shown in Fig. 3, to the position, as shown in Fig. 2, when the brakes are fully applied, and will immediately return to the position of rest when the braking pressure is released. If, then, before the brakes are next applied the volume of fluid in the brakes and fluid lines 12 has decreased, resulting in an increased brake shoe clearance, it is apparent that when braking pressure actuates the reciprocating member 23 it will tend to move said member 23 beyond the neutral position until there is no longer a flow of liquid in that direction. When such condition is arrived at, the pressures on both sides of the reciprocating member 23 will then be equal, except insofar as affected by the pressures exerted on the reciprocating member 23 by the springs 24 and 25. In this position the compression of spring 25 will be greater than the compression of the spring 24, so it is obvious that there would be a flow of liquid past the reciprocating member 23 until the pressures on both sides of said member are equal, at which stage the reciprocating member 23 will again resume its neutral position, as shown in Fig. 2.

If, on the other hand, before the brakes are next applied, the volume of fluid in the brakes and fluid lines 12 has increased, resulting in a decreased brake shoe clearance, it is apparent that when braking pressure actuates the reciprocating member 23, it will move said member 23 to a position short of the neutral position, inasmuch as the brake shoes will make contact and stop the flow of fluid before the reciprocating member 23 reaches its aforesaid neutral position. When such static condition is arrived at there will be no flow of fluid in or out of ports 17 and 19 and the fluid pressure on both sides of the reciprocating member 23 will be equal, except insofar as affected by the slight pressure exerted on the reciprocating member 23 by the springs 24 and 25. In this position short of neutral, the compression of spring 24 will be greater than the compression of spring 25. So it is obvious that, (whether in a hypothetical case the equal pressures at ports 17 and 19 be atmospheric and the fluid be air, or in the actual case where the pressure be 200 pounds per square inch and the fluid be oil) there will be a movement of the piston towards its neutral position and a corresponding movement of fluid from the brake side of reciprocating member 23 to the compressor side, either by seepage past the loose fitting reciprocating member 23, or around by means of a bypass such as 30 in Figure 6. If the static condition of pressure and flow at ports 17 and 19 is maintained long enough, reciprocating member 23 will eventually resume its neutral position, as shown in Figure 2, at which position the compressions of springs 24 and 25 are again equalized. If the braking pressure is now released, the reciprocating member will be rushed toward the compressor side until projection 29 engages seat 22, blocking off further flow of fluid and holding the brake shoes at their desired clearance.

Thus, it will be seen that by the automatic movement of the reciprocating member 23 of this device, the correct volume of fluid is maintained in the lines under normal operating conditions.

Having positive control over the fluid volume in the lines at all times by this device, it is apparent that the retracting movement of the actuated brake members is also controlled with the result that the brakes are automatically adjusted by this device to compensate for any deficiency or excess of fluid in the lines, without in the least affecting the normal, quick action of the brakes.

It also will be seen that with the liquid volume in the lines under automatic control at all times, the fluid will tend to fill all voids between the compressor piston and the actuated member, and thereby eliminate the possibility of air bubbles getting into the lines on the return stroke of the brake pedal.

Further, it will be seen that with the voids filled in the compressor and the fluid lines at every instant, it will be possible to keep a tight adjustment on the brake pedal with the result that effective work may be done at all stages of the compression stroke when the system is operating under normal conditions.

In case of excessive leakage of fluid or the breakage of one of the fluid lines, the reciprocating member 23 will travel the complete length of the cylinder 13, as shown in Fig. 4, thereby effecting a seal and preventing the further movement of liquid into that line.

Although I have hereinbefore set forth the preferred form of my invention, it is understood that certain modifications can be made such as shown in Figures 5 and 6. I disclose the use of a double acting spring in Figure 5, instead of two separate springs. One end of the spring is retained in an annular recess 32 in the cylinder 13, and the other end in an annular recess 33 in the reciprocating member 23, so that if the member 23 be at any position to the left of that shown in Figure 5, there will be a compression in the spring tending to force the member 23 to the right, for example when the device is compensating for a lack of fluid in the brakes 7 and lines 12. If the member 23 is in any position to the right of the position shown in Figure 5, there will be a tension in the spring tending to pull the reciprocating member 23 back to its neutral position, for example when compensating for a surplus of fluid in the brakes 7 and lines 12. In this modification of my invention, one spring can be adapted to perform the work of two.

In Figure 6 I disclose the use of a tightly fitted reciprocating member 23, together with a bypass 30, constructed within the cylinder 13. In this construction, instead of the fluid seeping around the sides of the loose fitting reciprocating member 23, when the springs 24 and 25 are centralizing it, the fluid can now flow around the member 23 by means of the bypass 30. This bypass could just as well be a small hole drilled through from face to face of reciprocating member 23, or could be a longitudinal groove cut in either the piston or cylinder wall to serve the same purpose. Just as long as there is an unobstructed but restricted means for the fluid to get from one side to the other of the reciprocating member 23, my requirements are satisfied. The use of a valve or valves in this passage or the use of a large passage would render the device useless for the purpose intended.

Various types of springs and spring actions are also contemplated as well as various shapes and combinations of pistons, cylinders, valve seats and so forth.

Having described my invention, what I now claim is:

1. An automatic hydraulic slack adjuster comprising a cylinder, an inlet port in one end of said cylinder, an outlet port in the opposite end of said cylinder, a floating piston in said cylinder, relatively weak double acting resilient means tending to move said piston towards a central portion in said cylinder without compromising the action of the fluid on said piston, restricted but unobstructed means for permitting the flow of fluid past said piston when said piston is in an unseated position, and means on said piston for simultaneously closing either of said ports and stopping the flow of fluid past said piston.

2. In combination with a hydraulic system having a fluid actuating member and fluid actuated member, a device of the character described comprising a cylinder having a port at each end, said ports communicating respectively with said actuating member and said actuated member, a floating piston in said cylinder, relatively weak resilient means tending to move said piston toward a position intermediate the ends of said cylinder without materially affecting the action of the fluid on said piston, means for permitting restricted but unobstructed flow of fluid past said piston at all times when said piston is in an unseated position, and means on said piston adapted to contact means in the port adjacent the actuating member to stop the flow of fluid through said last mentioned port.

3. In combination with a fluid system consisting of a fluid actuating member, a fluid actuated member and a fluid transfer line connecting said members, an automatic slack adjusting device interposed in said line, comprising a cylinder having means in each end thereof for making connection to said fluid transfer line, a piston in said cylinder, means for providing an unobstructed but restricted fluid by-pass around said piston at all times when said piston is in an unseated position, relatively weak double acting springs in said cylinder tending to move said piston toward a position intermediate the ends of said cylinder without materially compromising the action of the fluid on said piston, and means on said piston arranged to contact means on said cylinder for simultaneously stopping the by-pass of fluid around said piston and effecting a seal against the flow of fluid from the actuated member toward the actuating member after the latter has been released.

4. An automatic hydraulic slack adjusting device comprising a cylinder, fluid tight connections at the extreme ends of said cylinder, the primary connection leading to a fluid actuating device, the secondary connection leading to a fluid actuated device, a piston in said cylinder, said piston having a clearance sufficient to permit restricted by-pass of fluid about said piston at all times when said piston is in an unseated position, means on said piston adapted to contact means at the primary end of said cylinder to simultaneously block said by-pass and effect a positive seal against the return flow of fluid through said primary connection, and relatively weak flexible means in said cylinder tending to normally maintain said piston in a central position in said cylinder without materially compromising the action of the fluid on said piston.

5. In a fluid system having an actuating and actuated member, an automatic slack adjusting device comprising a valve body, a check valve in said body, a primary connection leading to said actuating member, a secondary connection leading to said actuated member, a valve seat between said check valve and said primary connection, an unobstructed yet restricted by-pass around said check valve when the latter is in an unseated position, and relatively weak flexible means tending to normally maintain said check valve in an unseated position without materially interfering with the action of the fluid on said check valve.

ARTHUR B. SCHULTZ.